(12) United States Patent
Hoese et al.

(10) Patent No.: US 6,738,854 B2
(45) Date of Patent: *May 18, 2004

(54) STORAGE ROUTER AND METHOD FOR PROVIDING VIRTUAL LOCAL STORAGE

(75) Inventors: Geoffrey B. Hoese, Austin, TX (US); Jeffry T. Russell, Cibolo, TX (US)

(73) Assignee: Crossroads Systems, Inc., Austin, TX (US)

(*) Notice: Subject to any disclaimer, the term of this patent is extended or adjusted under 35 U.S.C. 154(b) by 135 days.

This patent is subject to a terminal disclaimer.

(21) Appl. No.: 10/174,720

(22) Filed: Jun. 19, 2002

(65) Prior Publication Data

US 2002/0161950 A1 Oct. 31, 2002

Related U.S. Application Data

(63) Continuation of application No. 09/354,682, filed on Jul. 15, 1999, now Pat. No. 6,421,753, which is a continuation of application No. 09/001,799, filed on Dec. 31, 1997, now Pat. No. 5,941,972.

(51) Int. Cl.[7] .............................................. G06F 13/00
(52) U.S. Cl. ........................ 710/305; 710/11; 709/250
(58) Field of Search ............................. 710/1–5, 8–13, 710/22–28, 104–105, 305–316; 709/250

(56) References Cited

U.S. PATENT DOCUMENTS

| | | | | |
|---|---|---|---|---|
| 4,695,948 A | * | 9/1987 | Blevins et al. | 710/308 |
| 4,751,635 A | * | 6/1988 | Kret | 707/10 |
| 5,239,643 A | * | 8/1993 | Blount et al. | 707/102 |
| 5,257,386 A | * | 10/1993 | Saito | 712/225 |
| 5,347,384 A | * | 9/1994 | McReynolds et al. | 359/118 |
| 5,414,820 A | * | 5/1995 | McFarland et al. | 710/307 |
| 5,423,044 A | * | 6/1995 | Sutton et al. | 710/200 |
| 5,581,714 A | * | 12/1996 | Amini et al. | 710/315 |
| 5,596,562 A | * | 1/1997 | Chen | 710/315 |
| 5,596,736 A | * | 1/1997 | Kerns | 711/4 |
| 5,680,556 A | * | 10/1997 | Begun et al. | 710/315 |
| 5,701,491 A | * | 12/1997 | Dunn et al. | 717/167 |
| 5,712,976 A | * | 1/1998 | Falcon, Jr. et al. | 725/115 |
| 5,729,705 A | * | 3/1998 | Weber | 710/315 |
| 5,748,924 A | | 5/1998 | Llorens et al. | 395/309 |
| 5,751,975 A | * | 5/1998 | Gillespie et al. | 710/315 |
| 5,768,623 A | | 6/1998 | Judd et al. | 395/857 |
| 5,774,683 A | * | 6/1998 | Gulick | 710/315 |
| 5,809,328 A | * | 9/1998 | Nogales et al. | 710/5 |
| 5,812,754 A | | 9/1998 | Lui et al. | 395/182.04 |
| 5,835,496 A | | 11/1998 | Yeung et al. | 370/514 |

(List continued on next page.)

OTHER PUBLICATIONS

Trial Exhibits and Transcripts, Crossroads v. Chaparral, Civil Action No. A–00CA–21755, W.D. Tex., 2000 (CD–ROM and hard copy printouts).

*Primary Examiner*—Christopher B. Shin
(74) *Attorney, Agent, or Firm*—Gray Cary Ware & Freidenrich, LLP

(57) ABSTRACT

A storage router (56) and storage network (50) provide virtual local storage on remote SCSI storage devices (60, 62, 64) to Fibre Channel devices. A plurality of Fibre Channel devices, such as workstations (58), are connected to a Fibre Channel transport medium (52), and a plurality of SCSI storage devices (60, 62, 64) are connected to a SCSI bus transport medium (54). The storage router (56) interfaces between the Fibre Channel transport medium (52) and the SCSI bus transport medium (54). The storage router (56) maps between the workstations (58) and the SCSI storage devices (60, 62, 64) and implements access controls for storage space on the SCSI storage devices (60, 62, 64). The storage router (56) then allows access from the workstations (58) to the SCSI storage devices (60, 62, 64) using native low level, block protocol in accordance with the mapping and the access controls.

23 Claims, 2 Drawing Sheets

U.S. PATENT DOCUMENTS

| | | | |
|---|---|---|---|
| 5,845,107 A | * 12/1998 | Fisch et al. | 710/315 |
| 5,848,251 A | * 12/1998 | Lomelino et al. | 710/305 |
| 5,857,080 A | * 1/1999 | Jander et al. | 710/315 |
| 5,864,653 A | * 1/1999 | Tavallaei et al. | 714/2 |
| 5,884,027 A | * 3/1999 | Garbus et al. | 709/250 |
| 5,935,260 A | 8/1999 | Ofer | 714/42 |
| 5,941,969 A | * 8/1999 | Ram et al. | 710/315 |
| 5,941,972 A | * 8/1999 | Hoese et al. | 710/315 |
| 5,991,797 A | * 11/1999 | Futral et al. | 709/216 |
| 6,041,381 A | * 3/2000 | Hoese | 710/315 |
| 6,055,603 A | 4/2000 | Ofer et al. | 711/112 |
| 6,070,253 A | * 5/2000 | Tavallaei et al. | 714/31 |
| 6,098,149 A | 8/2000 | Ofer et al. | 711/112 |
| 6,131,119 A | * 10/2000 | Fukui | 709/224 |
| 6,141,737 A | * 10/2000 | Krantz et al. | 711/171 |
| 6,219,771 B1 | 4/2001 | Kikuchi et al. | |
| 6,223,266 B1 | * 4/2001 | Sartore | 711/170 |
| 6,330,629 B1 | * 12/2001 | Kondo et al. | 710/311 |
| 6,421,753 B1 | * 7/2002 | Hoese et al. | 710/305 |
| 6,425,035 B2 | * 7/2002 | Hoese et al. | 710/105 |
| 6,425,036 B2 | * 7/2002 | Hoese et al. | 710/62 |
| 6,484,245 B1 | 11/2002 | Sanada et al. | 711/164 |

\* cited by examiner

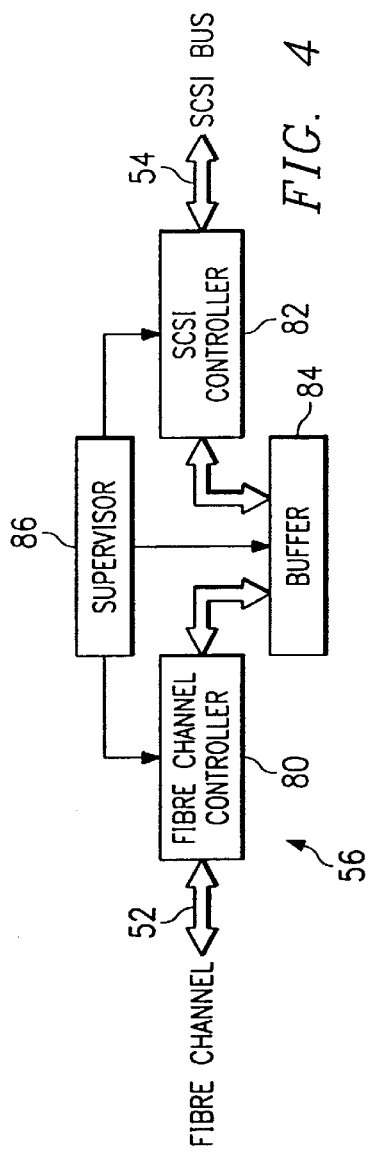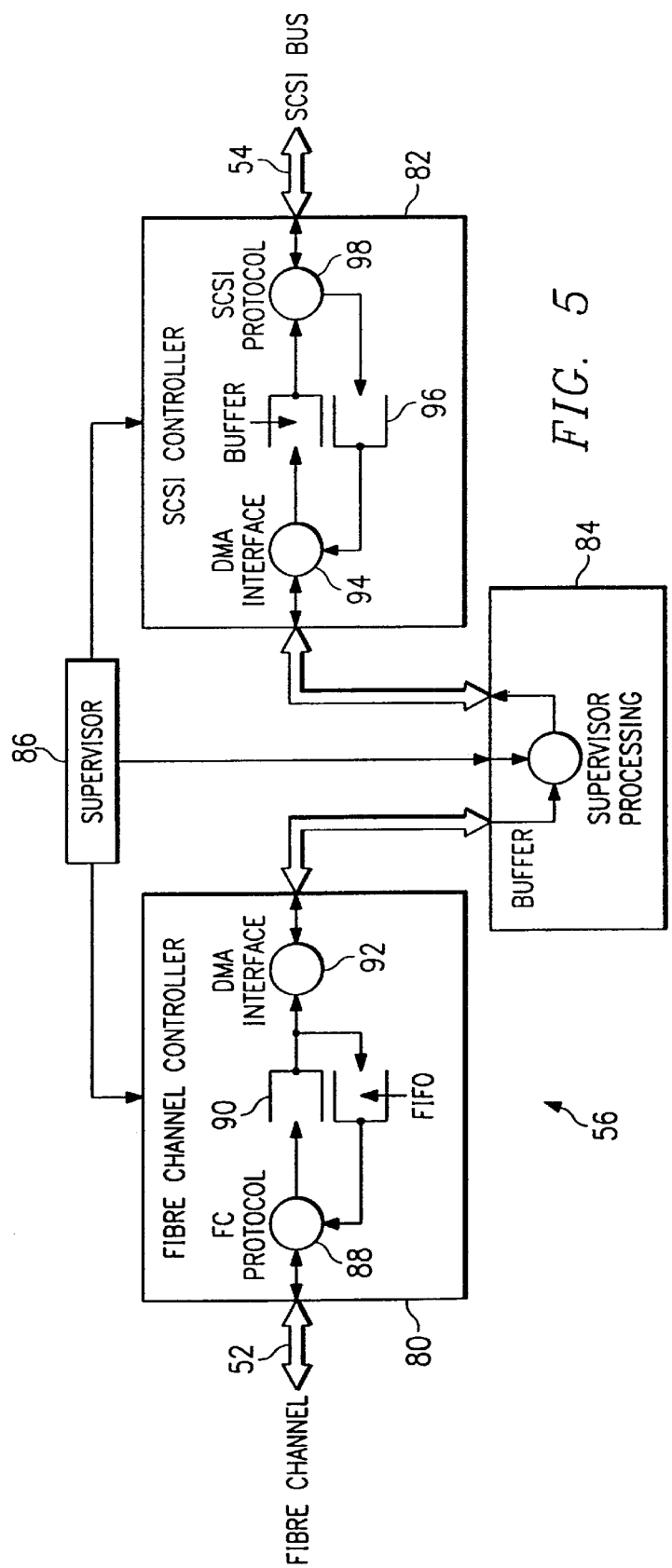

STORAGE ROUTER AND METHOD FOR PROVIDING VIRTUAL LOCAL STORAGE

RELATED APPLICATIONS

This application claims the benefit of the filing date of U.S. patent application Ser. No. 09/354,682 by inventors Geoffrey B. Hoese and Jeffry T. Russell, entitled "Storage Router and Method for Providing Virtual Local Storage" filed on Jul. 15, 1999, now U.S. Pat. No. 6,421,753, which is a continuation of U.S. patent application Ser. No. 09/001,799, filed on Dec. 31, 1997, now U.S. Pat. No. 5,941,972, and hereby incorporates these applications by reference in their entireties as if they had been fully set forth herein.

TECHNICAL FIELD OF THE INVENTION

This invention relates in general to network storage devices, and more particularly to a storage router and method for providing virtual local storage on remote SCSI storage devices to Fibre Channel devices.

BACKGROUND OF THE INVENTION

Typical storage transport mediums provide for a relatively small number of devices to be attached over relatively short distances. One such transport medium is a Small Computer System Interface (SCSI) protocol, the structure and operation of which is generally well known as is described, for example, in the SCSI-1, SCSI-2 and SCSI-3 specifications. High speed serial interconnects provide enhanced capability to attach a large number of high speed devices to a common storage transport medium over large distances. One such serial interconnect is Fibre Channel, the structure and operation of which is described, for example, in Fibre Channel Physical and Signaling Interface (FC-PH), ANSI X3.230 Fibre Channel Arbitrated Loop (FC-AL), and ANSI X3.272 Fibre Channel Private Loop Direct Attach (FC-PLDA).

Conventional computing devices, such as computer workstations, generally access storage locally or through network interconnects. Local storage typically consists of a disk drive, tape drive, CD-ROM drive or other storage device contained within, or locally connected to the workstation. The workstation provides a file system structure, that includes security controls, with access to the local storage device through native low level, block protocols. These protocols map directly to the mechanisms used by the storage device and consist of data requests without security controls. Network interconnects typically provide access for a large number of computing devices to data storage on a remote network server. The remote network server provides file system structure, access control, and other miscellaneous capabilities that include the network interface. Access to data through the network server is through network protocols that the server must translate into low level requests to the storage device. A workstation with access to the server storage must translate its file system protocols into network protocols that are used to communicate with the server. Consequently, from the perspective of a workstation, or other computing device, seeking to access such server data, the access is much slower than access to data on a local storage device.

SUMMARY OF THE INVENTION

In accordance with the present invention, a storage router and method for providing virtual local storage on remote SCSI storage devices to Fibre Channel devices are disclosed that provide advantages over conventional network storage devices and methods.

According to one aspect of the present invention, a storage router and storage network provide virtual local storage on remote SCSI storage devices to Fibre Channel devices. A plurality of Fibre Channel devices, such as workstations, are connected to a Fibre Channel transport medium, and a plurality of SCSI storage devices are connected to a SCSI bus transport medium. The storage router interfaces between the Fibre Channel transport medium and the SCSI bus transport medium. The storage router maps between the workstations and the SCSI storage devices and implements access controls for storage space on the SCSI storage devices. The storage router then allows access from the workstations to the SCSI storage devices using native low level, block protocol in accordance with the mapping and the access controls.

According to another aspect of the present invention, virtual local storage on remote SCSI storage devices is provided to Fibre Channel devices. A Fibre Channel transport medium and a SCSI bus transport medium are interfaced with. A configuration is maintained for SCSI storage devices connected to the SCSI bus transport medium. The configuration maps between Fibre Channel devices and the SCSI storage devices and implements access controls for storage space on the SCSI storage devices. Access is then allowed from Fibre Channel initiator devices to SCSI storage devices using native low level, block protocol in accordance with the configuration.

A technical advantage of the present invention is the ability to centralize local storage for networked workstations without any cost of speed or overhead. Each workstation access its virtual local storage as if it work locally connected. Further, the centralized storage devices can be located in a significantly remote position even in excess of ten kilometers as defined by Fibre Channel standards.

Another technical advantage of the present invention is the ability to centrally control and administer storage space for connected users without limiting the speed with which the users can access local data. In addition, global access to data, backups, virus scanning and redundancy can be more easily accomplished by centrally located storage devices.

A further technical advantage of the present invention is providing support for SCSI storage devices as local storage for Fibre Channel hosts. In addition, the present invention helps to provide extended capabilities for Fibre Channel and for management of storage subsystems.

BRIEF DESCRIPTION OF THE DRAWINGS

A more complete understanding of the present invention and the advantages thereof may be acquired by referring to the following description taken in conjunction with the accompanying drawings, in which like reference numbers indicate like features, and wherein:

FIG. 4 is a block diagram of one embodiment of the storage router of FIG. 3; and FIG. 5 is a block diagram of one embodiment of data flow within the storage router of FIG. 4.

DETAILED DESCRIPTION OF THE INVENTION

Figure 1:
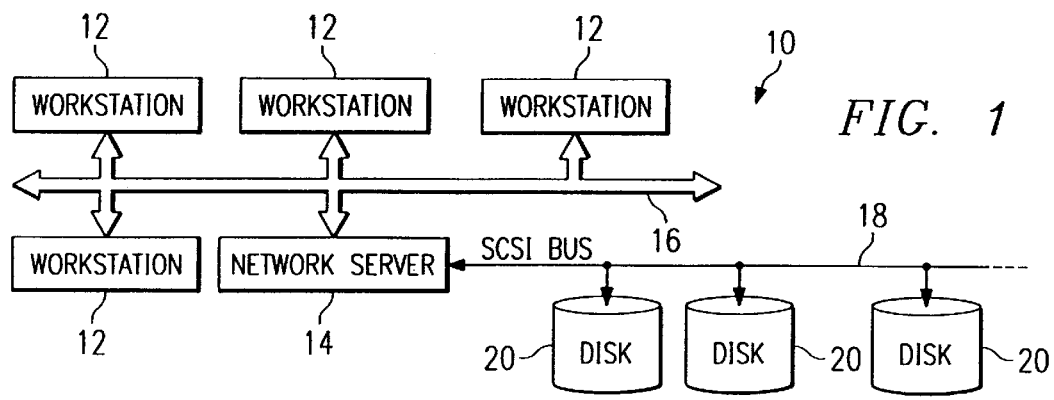
FIG. 1 is a block diagram of a conventional network that provides storage through a network server.

FIG. 1 is a block diagram of a conventional network, indicated generally at 10, that provides access to storage through a network server. As shown, network 10 includes a plurality of workstations 12 interconnected with a network server 14 via a network transport medium 16. Each workstation 12 can generally comprise a processor, memory, input/output devices, storage devices and a network adapter as well as other common computer components. Network server 14 uses a SCSI bus 18 as a storage transport medium to interconnect with a plurality of storage devices 20 (tape drives, disk drives, etc.). In the embodiment of FIG. 1, network transport medium 16 is an network connection and storage devices 20 comprise hard disk drives, although there are numerous alternate transport mediums and storage devices.

In network 10, each workstation 12 has access to its local storage device as well as network access to data on storage devices 20. The access to a local storage device is typically through native low level, block protocols. On the other hand, access by a workstation 12 to storage devices 20 requires the participation of network server 14 which implements a file system and transfers data to workstations 12 only through high level file system protocols. Only network server 14 communicates with storage devices 20 via native low level, block protocols. Consequently, the network access by workstations 12 through network server 14 is slow with respect to their access to local storage. In network 10, it can Also be a logistical problem to centrally manage and administer local data distributed across an organization, including accomplishing tasks such as backups, virus scanning and redundancy.

Figure 2:
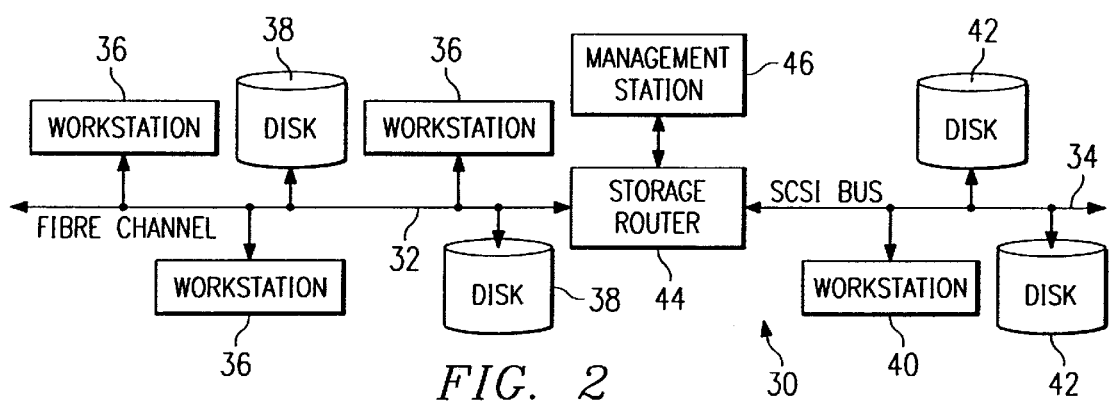
FIG. 2 is a block diagram of one embodiment of a storage network with a storage router that provides global access and routing.

FIG. 2 is a block diagram of one embodiment of a storage network, indicated generally at 30, with a storage router that provides global access and routing. This environment is significantly different from that of FIG. 1 in that there is no network server involved. In FIG. 2, a Fibre Channel high speed serial transport 32 interconnects a plurality of workstations 36 and storage devices 38. A SCSI bus storage transport medium interconnects workstations 40 and storage devices 42. A storage router 44 then serves to interconnect these mediums and provide devices on either medium global, transparent access to devices on the other medium. Storage router 44 routes requests from initiator devices on one medium to target devices on the other medium and routes data between the target and the initiator. Storage router 44 can allow initiators and targets to be on either side. In this manner, storage router 44 enhances the functionality of Fibre Channel 32 by providing access, for example, to legacy SCSI storage devices on SCSI bus 34. In the embodiment of FIG. 2, the operation of storage router 44 can be managed by a management station 46 connected to the storage router via a direct serial connection.

In storage network 30, any workstation 36 or workstation 40 can access any storage device 38 or storage device 42 through native low level, block protocols, and vice versa. This functionality is enabled by storage router 44 which routes requests and data as a generic transport between Fibre Channel 32 and SCSI bus 34. Storage router 44 uses tables to map devices from one medium to the other and distributes requests and data across Fibre Channel 32 and SCSI bus 34 without any security access controls. Although this extension of the high speed serial interconnect provided by Fibre Channel 32 is beneficial, it is desirable to provide security controls in addition to extended access to storage devices through a native low level, block protocol.

Figure 3:
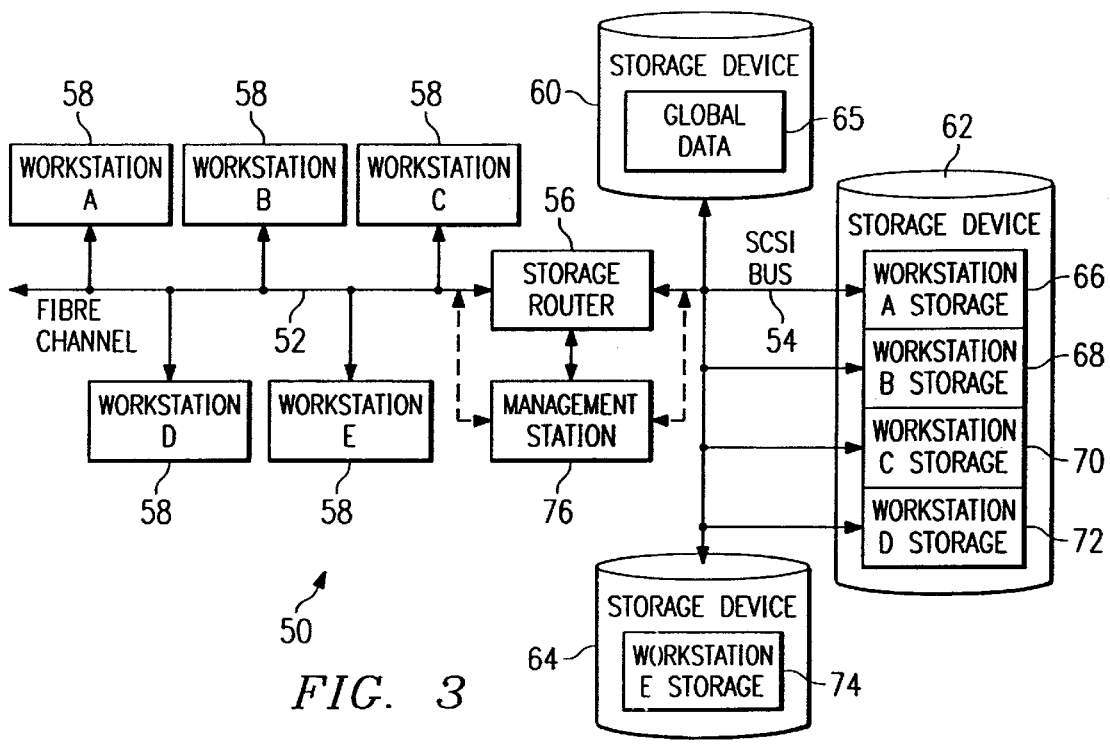
FIG. 3 is a block diagram of one embodiment of a storage network with a storage router that provides virtual local storage.

FIG. 3 is a block diagram of one embodiment of a storage network, indicated generally at 50, with a storage router that provides virtual local storage. Similar to that of FIG. 2, storage network 50 includes a Fibre Channel high speed serial interconnect 52 and a SCSI bus 54 bridged by a storage router 56. Storage router 56 of FIG. 3 provides for a large number of workstations 58 to be interconnected on a common storage transport and to access common storage devices 60, 62 and 64 through native low level, block protocols.

According to the present invention, storage router 56 has enhanced functionality to implement security controls and routing such that each workstation 58 can have access to a specific subset of the overall data stored in storage devices 60, 62 and 64. This specific subset of data has the appearance and characteristics of local storage and is referred to herein as virtual local storage. Storage router 56 allows the configuration and modification of the storage allocated to each attached workstation 58 through the use of mapping tables or other mapping techniques.

As shown in FIG. 3, for example, storage device 60 can be configured to provide global data 65 which can be accessed by all workstations 58. Storage device 62 can be configured to provide partitioned subsets 66, 68, 70 and 72, where each partition is allocated to one of the workstations 58 (workstations A, B, C and D). These subsets 66, 68, 70 and 72 can only be accessed by the associated workstation 58 and appear to the associated workstation 58 as local storage accessed using native low level, block protocols. Similarly, storage device 64 can be allocated as storage for the remaining workstation 58 (workstation E).

Storage router 56 combines access control with routing such that each workstation 58 has controlled access to only the specified partition of storage device 62 which forms virtual local storage for the workstation 58. This access control allows security control for the specified data partitions. Storage router 56 allows this allocation of storage devices 60, 62 and 64 to be managed by a management station 76. Management station 76 can connect directly to storage router 56 via a direct connection or, alternately, can interface with storage router 56 through either Fibre Channel 52 or SCSI bus 54. In the latter case, management station 76 can be a workstation or other computing device with special rights such that storage router 56 allows access to mapping tables and shows storage devices 60, 62 and 64 as they exist physically rather than as they have been allocated.

The environment of FIG. 3 extends the concept of a single workstation having locally connected storage devices to a storage network 50 in which workstations 58 are provided virtual local storage in a manner transparent to workstations 58. Storage router 56 provides centralized control of what each workstation 58 sees as its local drive, as well as what data it sees as global data accessible by other workstations 58. Consequently, the storage space considered by the workstation 58 to be its local storage is actually a partition (i.e., logical storage definition) of a physically remote storage device 60, 62 or 64 connected through storage router 56. This means that similar requests from workstations 58 for access to their local storage devices produce different accesses to the storage space on storage devices 60, 62 and 64. Further, no access from a workstation 58 is allowed to the virtual local storage of another workstation 58.

The collective storage provided by storage devices 60, 62 and 64 can have blocks allocated by programming means within storage router 56. To accomplish this function, storage router 56 can include routing tables and security controls that define storage allocation for each workstation 58. The advantages provided by implementing virtual local storage in centralized storage devices include the ability to do collective backups and other collective administrative functions more easily. This is accomplished without limiting the performance of workstations 58 because storage access involves native low level, block protocols and does not involve the overhead of high level protocols and file systems required by network servers.

FIG. 4 is a block diagram of one embodiment of storage router 56 of FIG. 3. Storage router 56 can comprise a Fibre Channel controller 80 that interfaces with Fibre Channel 52 and a SCSI controller 82 that interfaces with SCSI bus 54. A buffer 84 provides memory work space and is connected to both Fibre Channel controller 80 and to SCSI controller 82. A supervisor unit 86 is connected to Fibre Channel controller 80, SCSI controller 82 and buffer 84. Supervisor unit 86 comprises a microprocessor for controlling operation of storage router 56 and to handle mapping and security access for requests between Fibre Channel 52 and SCSI bus 54.

FIG. 5 is a block diagram of one embodiment of data flow within storage router 56 of FIG. 4. As shown, data from Fibre Channel 52 is processed by a Fibre Channel (FC) protocol unit 88 and placed in a FIFO queue 90. A direct memory access (DMA) interface 92 then takes data out of FIFO queue 90 and places it in buffer 84. Supervisor unit 86 processes the data in buffer 84 as represented by supervisor processing 93. This processing involves mapping between Fibre Channel 52 and SCSI bus 54 and applying access controls and routing functions. A DMA interface 94 then pulls data from buffer 84 and places it into a buffer 96. A SCSI protocol unit 98 pulls data from buffer 96 and communicates the data on SCSI bus 54. Data flow in the reverse direction, from SCSI bus 54 to Fibre Channel 52, is accomplished in a reverse manner.

The storage router of the present invention is a bridge device that connects a Fibre Channel link directly to a SCSI bus and enables the exchange of SCSI command set information between application clients on SCSI bus devices and the Fibre Channel links. Further, the storage router applies access controls such that virtual local storage can be established in remote SCSI storage devices for workstations on the Fibre Channel link. In one embodiment, the storage router provides a connection for Fibre Channel links running the SCSI Fibre Channel Protocol (FCP) to legacy SCSI devices attached to a SCSI bus. The Fibre Channel topology is typically an Arbitrated Loop (FC_AL).

In part, the storage router enables a migration path to Fibre Channel based, serial SCSI networks by providing connectivity for legacy SCSI bus devices. The storage router can be attached to a Fibre Channel Arbitrated Loop and a SCSI bus to support a number of SCSI devices. Using configuration settings, the storage router can make the SCSI bus devices available on the Fibre Channel network as FCP logical units. Once the configuration is defined, operation of the storage router is transparent to application clients. In this manner, the storage router can form an integral part of the migration to new Fibre Channel based networks while providing a means to continue using legacy SCSI devices.

In one implementation (not shown), the storage router can be a rack mount or free standing device with an internal power supply. The storage router can have a Fibre Channel and SCSI port, and a standard, detachable power cord can be used, the FC connector can be a copper DB9 connector, and the SCSI connector can be a 68-pin type. Additional modular jacks can be provided for a serial port and a 802.3 10BaseT port, i.e. twisted pair Ethernet, for management access. The SCSI port of the storage router an support SCSI direct and sequential access target devices and can support SCSI initiators, as well. The Fibre Channel port can interface to SCSI-3 FCP enabled devices and initiators.

To accomplish its functionality, one implementation of the storage router uses: a Fibre Channel interface based on the HEWLETT-PACKARD TACHYON HPFC-5000 controller and a GLM media interface; an Intel 80960RP processor, incorporating independent data and program memory spaces, and associated logic required to implement a stand alone processing system; and a serial port for debug and system configuration. Further, this implementation includes a SCSI interface supporting Fast-20 based on the SYMBIOS 53C8xx series SCSI controllers, and an operating system based upon the WIND RIVERS SYSTEMS VXWORKS or IXWORKS kernel, as determined by design. In addition, the storage router includes software as required to control basic functions of the various elements, and to provide appropriate translations between the FC and SCSI protocols.

The storage router has various modes of operation that are possible between FC and SCSI target and initiator combinations. These modes are: FC Initiator to SCSI Target; SCSI Initiator to FC Target; SCSI Initiator to SCSI Target; and FC Initiator to FC Target. The first two modes can be supported concurrently in a single storage router device are discussed briefly below. The third mode can involve two storage router devices back to back and can serve primarily as a device to extend the physical distance beyond that possible via a direct SCSI connection. The last mode can be used to carry FC protocols encapsulated on other transmission technologies (e.g. ATM, SONET), or to act as a bridge between two FC loops (e.g. as a two port fabric).

The FC Initiator to SCSI Target mode provides for the basic configuration of a server using Fibre Channel to communicate with SCSI targets. This mode requires that a host system have an FC attached device and associated device drivers and software to generate SCSI-3 FCP requests. This system acts as an initiator using the storage router to communicate with SCSI target devices. The SCSI devices supported can include SCSI-2 compliant direct or sequential access (disk or tape) devices. The storage router serves to translate command and status information and transfer data between SCSI-3 FCP and SCSI-2, allowing the use of standard SCSI-2 devices in a Fibre Channel environment.

The SCSI Initiator to FC Target mode provides for the configuration of a server using SCSI-2 to communicate with Fibre Channel targets. This mode requires that a host system has a SCSI-2 interface and driver software to control SCSI-2 target devices. The storage router will connect to the SCSI-2 bus and respond as a target to multiple target IDs. Configuration information is required to identify the target IDs to which the bridge will respond on the SCSI-2 bus. The storage router then translates the SCSI-2 requests to SCSI-3 FCP requests, allowing the use of FC devices with a SCSI host system. This will also allow features such as a tape device acting as an initiator on the SCSI bus to provide full support for this type of SCSI device.

In general, user configuration of the storage router will be needed to support various functional modes of operation. Configuration can be modified, for example, through a serial port or through an Ethernet port via SNMP (simple network management protocol) or a Telnet session. Specifically, SNMP manageability can be provided via an 802.3 Ethernet interface. This can provide for configuration changes as well as providing statistics and error information. Configuration can also be performed via TELNET or RS-232 interfaces with menu driven command interfaces. Configuration information can be stored in a segment of flash memory and can be retained across resets and power off cycles. Password protection can also be provided.

In the first two modes of operation, addressing information is needed to map from FC addressing to SCSI addressing and vice versa. This can be 'hard' configuration data, due to the need for address information to be maintained across initialization and partial reconfigurations of the Fibre Channel address space. In an arbitrated loop configuration, user configured addresses will be needed for AL_PAs in order to insure that known addresses are provided between loop reconfigurations.

With respect to addressing, FCP and SCSI 2 systems employ different methods of addressing target devices. Additionally, the inclusion of a storage router means that a method of translating device IDs needs to be implemented. In addition, the storage router can respond to commands without passing the commands through to the opposite interface. This can be implemented to allow all generic FCP and SCSI commands to pass through the storage router to address attached devices, but allow for configuration and diagnostics to be performed directly on the storage router through the FC and SCSI interfaces.

Management commands are those intended to be processed by the storage router controller directly. This may include diagnostic, mode, and log commands as well as other vendor-specific commands. These commands can be received and processed by both the FCP and SCSI interfaces, but are not typically bridged to the opposite interface. These commands may also have side effects on the operation of the storage router, and cause other storage router operations to change or terminate.

A primary method of addressing management commands though the FCP and SCSI interfaces can be through peripheral device type addressing. For example, the storage router can respond to all operations addressed to logical unit (LUN) zero as a controller device. Commands that the storage router will support can include INQUIRY as well as vendor-specific management commands. These are to be generally consistent with SCC standard commands.

The SCSI bus is capable of establishing bus connections between targets. These targets may internally address logical units. Thus, the prioritized addressing scheme used by SCSI subsystems can be represented as follows: BUS:TARGET:LOGICAL UNIT. The BUS identification is intrinsic in the configuration, as a SCSI initiator is attached to only one-bus. Target addressing is handled by bus arbitration from information provided to the arbitrating device. Target addresses are assigned to SCSI devices directly, though some means of configuration, such as a hardware jumper, switch setting, or device specific software configuration. As such, the SCSI protocol provides only logical unit addressing within the Identify message. Bus and target information is implied by the established connection.

Fibre Channel devices within a fabric are addressed by a unique port identifier. This identifier is assigned to a port during certain well-defined states of the FC protocol. Individual ports are allowed to arbitrate for a known, user defined address. If such an address is not provided, or if arbitration for a particular user address fails, the port is assigned a unique address by the FC protocol. This address is generally not guaranteed to be unique between instances. Various scenarios exist where the AL-PA of a device will change, either after power cycle or loop reconfiguration.

The FC protocol also provides a logical unit address field within command structures to provide addressing to devices internal to a port. The FCP_CMD payload specifies an eight byte LUN field. Subsequent identification of the exchange between devices is provided by the FQXID (Fully Qualified Exchange ID).

FC ports can be required to have specific addresses assigned. Although basic functionality is not dependent on this, changes in the loop configuration could result in disk targets changing identifiers with the potential risk of data corruption or loss. This configuration can be straightforward, and can consist of providing the device a loop-unique ID (AL_PA) in the range of "01h" to "EFh." Storage routers could be shipped with a default value with the assumption that most configurations will be using single storage routers and no other devices requesting the present ID. This would provide a minimum amount of initial configuration to the system administrator. Alternately, storage routers could be defaulted to assume any address so that configurations requiring multiple storage routers on a loop would not require that the administrator assign a unique ID to the additional storage routers.

Address translation is needed where commands are issued in the cases FC Initiator to SCSI Target and SCSI Initiator to FC Target. Target responses are qualified by the FQXID and will retain the translation acquired at the beginning of the exchange. This prevents configuration changes occurring during the course of execution of a command from causing data or state information to be inadvertently misdirected. Configuration can be required in cases of SCSI Initiator to FC Target, as discovery may not effectively allow for FCP targets to consistently be found. This is due to an FC arbitrated loop supporting addressing of a larger number of devices than a SCSI bus and the possibility of FC devices changing their AL-PA due to device insertion or other loop initialization.

In the direct method, the translation to BUS:TARGET:LUN of the SCSI address information will be direct. That is, the values represented in the FCP LUN field will directly map to the values in effect on the SCSI bus. This provides a clean translation and does not require SCSI bus discovery. It also allows devices to be dynamically added to the SCSI bus without modifying the address map. It may not allow for complete discovery by FCP initiator devices, as gaps between device addresses may halt the discovery process. Legacy SCSI device drivers typically halt discovery on a target device at the first unoccupied LUN, and proceed to the next target. This would lead to some devices not being discovered. However, this allows for hot plugged devices and other changes to the loop addressing.

In the ordered method, ordered translation requires that the storage router perform discovery on reset, and collapses the addresses on the SCSI bus to sequential FCP LUN values. Thus, the FCP LUN values 0–N can represent N+1 SCSI devices, regardless of SCSI address values, in the order in which they are isolated during the SCSI discovery process. This would allow the FCP initiator discovery process to identify all mapped SCSI devices without further configuration. This has the limitation that hot-plugged devices will not be identified until the next reset cycle. In this case, the address may also be altered as well.

In addition to addressing, according to the present invention, the storage router provides configuration and access controls that cause certain requests from FC Initiators to be directed to assigned virtual local storage partitioned on SCSI storage devices. For example, the same request for LUN 0 (local storage) by two different FC Initiators can be directed to two separate subsets of storage. The storage router can use tables to map, for each initiator, what storage access is available and what partition is being addressed by a particular request. In this manner, the storage space provided by SCSI storage devices can be allocated to FC initiators to provide virtual local storage as well as to create any other desired configuration for secured access.

Although the present invention has been described in detail, it should be understood that various changes, substitutions, and alterations can be made hereto without departing from the spirit and scope of the invention as defined by the appended claims.

What is claimed is:

1. A device comprising:
   a first buffer providing memory work space;
   a first controller operable to connect to and interface with a first transport medium, wherein the first transport medium is operable according to a first protocol;
   a second controller operable to connect to and interface with a second transport medium, wherein the second transport medium is operable according to a second protocol; and
   a supervisor unit coupled to the first controller, the second controller and the first buffer, the supervisor unit operable:
   to map between devices connected to the first transport medium and storage devices connected to the second transport medium,
   to implement access controls for storage space on the storage devices and
   to process data in the first buffer to interface between the first controller and the second controller to allow access from devices connected to the first transport medium to the storage devices using native low level, block protocols.

2. The device of claim 1, wherein the supervisor unit maintains an allocation of subsets of storage space to associated devices connected to the first transport medium, wherein each subset is only accessible by the associated device connected to the first transport medium.

3. The device of claim 2, wherein the devices connected to the first transport medium comprise workstations.

4. The device of claim 2, wherein the storage devices comprise hard disk drives.

5. The device of claim 1, wherein the first controller comprises:
   a first protocol unit operable to connect to the first transport medium;
   a first-in-first-out queue coupled to the first protocol unit; and
   a direct memory access (DMA) interface coupled to the first-in-first-out queue and to the first buffer.

6. The device of claim 1, wherein the second controller comprises:
   a second protocol unit operable to connect to the second transport medium;
   an internal buffer coupled to the second protocol unit; and
   a direct memory access (DMA) interface coupled to the internal buffer and to the first buffer.

7. The device of claim 1: wherein the first protocol is selected from the group consisting of Fibre Channel, SCSI, iSCSI, Serial Attached SCSI, and Serial ATA; and wherein the second protocol is selected from the group consisting of Fibre Channel, SCSI, iSCSI, Serial Attached SCSI, and Serial ATA.

8. The device of claim 1, wherein the first transport medium is separate from the second transport medium.

9. The device of claim 1, wherein the first protocol is different from the second protocol.

10. A storage network, comprising:
    a first transport medium operable according to a first protocol;
    a second transport medium operable according to a second protocol;
    a plurality of workstations connected to the first transport medium;
    a plurality of storage devices connected to the second transport medium; and
    a storage router interfacing between the first transport medium and the second transport medium, the storage router providing virtual local storage on the storage devices to the workstations and operable:
    to map between the workstations and the storage devices;
    to implement access controls for storage space on the storage devices; and
    to allow access from the workstations to the storage devices using native low level, block protocol in accordance with the mapping and access controls.

11. The storage network of claim 10, wherein the access controls include an allocation of subsets of storage space to associated workstations, wherein each subset is only accessible by the associated workstation.

12. The storage network of claim 10, wherein the storage devices comprise hard disk drives.

13. The storage network of claim 10, wherein the storage router comprises:
    a buffer providing memory work space for the storage router;
    a first controller operabie to connect to and interface with the first transport medium, the first controller further operable to pull outgoing data from the buffer and to place incoming data into the buffer;
    a second controller operable to connect to and interface with the second transport medium, the second controller further operable to pull outgoing data from the buffer and to place incoming data into the buffer; and
    a supervisor unit coupled to the first controller, the second controller and the buffer, the supervisor unit operable:
    to map between devices connected to the first transport medium and the storage devices, to implement the access controls for storage space on the storage devices and to process data in the buffer to interface between the first controller and the second controller to allow access from workstations to storage devices.

14. The storage network of claim 10: wherein the protocol is selected from the group consisting of Fibre Channel, SCSI, iSCSI, Serial Attached SCSI, and Serial ATA; and wherein the second protocol is selected from the group consisting of Fibre Channel, SCSI, iSCSI, Serial Attached SCSI, and Serial ATA.

15. The storage network of claim 10, wherein the first transport medium is separate from the second transport medium.

16. The storage network of claim 10, wherein the first protocol is different from the second protocol.

17. A method comprising:
    interfacing with a first transport medium which is operable according to a first protocol;
    interfacing with a second transport medium which is operable according to a second protocol;
    mapping between devices connected to the first transport medium and storage devices connected to the second transport medium;

implementing access controls for storage space on the storage devices; and allowing access from devices connected to the first transport medium to the storage devices using native low level, block protocols.

18. The method of claim 17, wherein mapping between devices connected to the first transport medium and the storage devices includes allocating subsets of storage space to associated devices connected to the first transport medium, wherein each subset is only accessible by the associated device connected to the first transport medium.

19. The method of claim 18, wherein the devices connected to the first transport medium comprise workstations.

20. The method of claim 18, wherein the storage devices comprise hard disk drives.

21. The method of claim 17: wherein the first protocol is selected from the group consisting of Fibre Channel, SCSI, iSCSI, Serial Attached SCSI, and Serial ATA; and wherein the second protocol is selected from the group consisting of Fibre Channel, SCSI, iSCSI, Serial Attached SCSI, and Serial ATA.

22. The method of claim 17, wherein the first transport medium is separate from the second transport medium.

23. The method of claim 17, wherein the first protocol is different from the second protocol.

\* \* \* \* \*

(12) EX PARTE REEXAMINATION CERTIFICATE (5408th)
United States Patent
Hoese et al.

(10) Number: US 6,738,854 C1
(45) Certificate Issued: *Jun. 13, 2006

(54) STORAGE ROUTER AND METHOD FOR PROVIDING VIRTUAL LOCAL STORAGE

(75) Inventors: Geoffrey B. Hoese, Austin, TX (US); Jeffry T. Russell, Cibolo, TX (US)

(73) Assignee: Crossworlds Software, Burlingame, CA (US)

Reexamination Request:
No. 90/007,127, Jul. 19, 2004

Reexamination Certificate for:
Patent No.: 6,738,854
Issued: May 18, 2004
Appl. No.: 10/174,720
Filed: Jun. 19, 2002

(*) Notice: This patent is subject to a terminal disclaimer.

Related U.S. Application Data

(63) Continuation of application No. 09/354,682, filed on Jul. 15, 1999, now Pat. No. 6,421,753, which is a continuation of application No. 09/001,799, filed on Dec. 31, 1997, now Pat. No. 5,941,972.

(51) Int. Cl.
   *G06F 13/00* (2006.01)

(52) U.S. Cl. .............................. 710/315; 710/2; 710/8; 710/36; 710/105; 710/305; 710/308; 711/112

(58) Field of Classification Search ................. 710/1–5, 710/8–13, 22–28, 104–105, 305–316; 709/250; 711/100, 112, 113
See application file for complete search history.

(56) References Cited

U.S. PATENT DOCUMENTS

| 3,082,406 | A |  | 3/1963 | Stevens |
| 4,092,732 | A |  | 5/1978 | Ouchi |
| 4,864,532 | A |  | 9/1989 | Reeve et al. |
| 4,947,367 | A |  | 8/1990 | Chang et al. |
| 5,072,378 | A |  | 12/1991 | Manka |
| 5,163,131 | A |  | 11/1992 | Row et al. |
| 5,239,632 | A |  | 8/1993 | Larner |
| 5,345,565 | A | * | 9/1994 | Jibbe et al. ................. 710/316 |
| 5,394,526 | A | * | 2/1995 | Crouse et al. .............. 709/219 |
| 5,465,382 | A |  | 11/1995 | Day, III et al. |
| 5,530,845 | A |  | 6/1996 | Hiatt et al. |

(Continued)

FOREIGN PATENT DOCUMENTS

| EP | 0810530 A2 | 12/1997 |
| EP | 0827059 A2 | 3/1998 |
| GB | 2296798 A | 7/1996 |
| GB | 2297636 A | 8/1996 |
| GB | 2341715 | 3/2000 |
| JP | 6301607 | 10/1994 |
| JP | 8-230895 | 9/1996 |
| WO | WO 98/36357 | 8/1998 |
| WO | WO 99/34297 A1 | 7/1999 |

OTHER PUBLICATIONS

Petal: Distributed Virtual Disks, Edward K. Lee and Chandramohan A. Thekkath, ACM SIGPLAN Notices, vol. 31, Issue 9, Sep. 1996, pp. 84–92.*

(Continued)

*Primary Examiner*—Fritz Fleming

(57) ABSTRACT

A storage router (56) and storage network (50) provide virtual local storage on remote SCSI storage devices (60, 62, 64) to Fibre Channel devices. A plurality of Fibre Channel devices, such as workstations (58), are connected to a Fibre Channel transport medium (52), and a plurality of SCSI storage devices (60, 62, 64) are connected to a SCSI bus transport medium (54). The storage router (56) interfaces between the Fibre Channel transport medium (52) and the SCSI bus transport medium (54). The storage router (56) maps between the workstations (58) and the SCSI storage devices (60, 62, 64) and implements access controls for storage space on the SCSI storage devices (60, 62, 64). The storage router (56) then allows access from the workstations (58) to the SCSI storage devices (60, 62, 64) using native low level, block protocol in accordance with the mapping and the access controls.

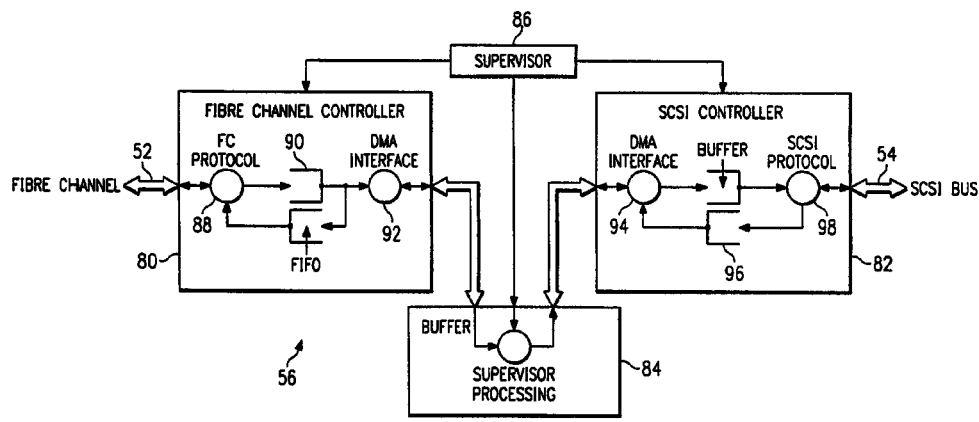

U.S. PATENT DOCUMENTS

| | | | |
|---|---|---|---|
| 5,535,352 | A | 7/1996 | Bridges et al. |
| 5,598,541 | A | 1/1997 | Malladi |
| 5,634,111 | A * | 5/1997 | Oeda et al. ................. 711/153 |
| 5,743,847 | A | 4/1998 | Nakamura et al. |
| 5,787,242 | A * | 7/1998 | DeKoning et al. ............. 714/5 |
| 5,867,648 | A | 2/1999 | Foth et al. |
| 5,913,045 | A | 6/1999 | Gillespie et al. |
| 5,923,557 | A | 7/1999 | Edison |
| 5,953,511 | A | 9/1999 | Sescila et al. |
| 5,959,994 | A | 9/1999 | Boggs et al. |
| 5,974,530 | A | 10/1999 | Young |
| 5,978,379 | A | 11/1999 | Chan et al. |
| 6,000,020 | A | 12/1999 | Chin et al. |
| 6,021,451 | A | 2/2000 | Bell et al. |
| 6,065,087 | A | 5/2000 | Keaveny et al. |
| 6,075,863 | A | 6/2000 | Krishnan et al. |
| 6,118,766 | A | 9/2000 | Akers |
| 6,134,617 | A | 10/2000 | Weber |
| 6,145,006 | A | 11/2000 | Vishlitsky et al. |
| 6,148,004 | A | 11/2000 | Nelson et al. |
| 6,209,023 | B1 | 3/2001 | Dimitroff et al. |
| 6,230,218 | B1 | 5/2001 | Casper et al. |
| 6,260,120 | B1 | 7/2001 | Blumenau et al. |
| 6,341,315 | B1 | 1/2002 | Arroyo et al. |
| 6,343,324 | B1 | 1/2002 | Hubis et al. |
| 6,363,462 | B1 | 3/2002 | Bergsten |
| 6,529,996 | B1 | 3/2003 | Nguyen et al. |

OTHER PUBLICATIONS

Systems Architectures Using Fibre Channel, Roger Cummings, Twelfth IEE Symposium on Mass Storage Systems, copyright 1993 IEEE. pp. 251–256.*

Fibre Channel and ATM: The Physical Layers, Jerry Quam, WESCON/94, published Sep. 27–29, 1994. pp. 648–652.*

Black Box, SCSI Fiberoptic Extender, Single–Ended, Product Insert, 2 pages, 1996, Jun. 18, 2005.

Block–Based Distributed File Systems, Anthony J. McGregor, Jul. 1997.

CRD–5500, Raid Disk Array Controller Product Insert, pp. 1–5.

CRD–5500 SCSI RAID Controller User's Manual CMD Technology, Inc. pp. 1–1 to 6–25, revised Nov. 21, 1996.

CRD–5500, SCSI Raid Controller OEM Manual, Rev. 1.3, Feb. 26, 1996, pp. 1–54.

Compaq StorageWorks HSG80 Array Controller ACS Version 8.3 (Maintenance and Service Guide) Nov. 1998.

Compaq StorageWorks HSG80 Array Controller ACS Version 8.3 (Configuration and CLI Reference Guide) Nov. 1998.

DIGITAL StorageWorks HSZ70 Array Controller HSOF Version 7.0 EK–HSZ70–RM A01 CLI Reference Manual.

DIGITAL StorageWorks, HSZ70 Array Controller, HSOF Version 7.0 EK–HSZ70–CG. A01, Digital Equipment Corporation, Maynard, Massachusetts.

DIGITAL StorageWorks, Using Your HSZ70 Array Controller in a SCSI Controller Shelf (DS–BA356–M Series), User's Guide, pp. 1–1 through A–5 with index, Jan. 1998.

DIGITAL StorageWorks HSG80 Array Controller ACS Version 8.0 (User's Guide) Jan. 1998.

DIGITAL StorageWorks HSZ70 Array Controller HSOF Version 7.0 EK–HSZ70–SV. A01.

DP5380 Asynchronous SCSI Interface, National Semiconductor Corporation, Arlington, TX, May 1989, pp. 1–32.

Emerson, "Ancor Communications: Performance evaluation of switched fibre channel I/O system using —FCP for SCSI" Feb. 1995, IEEE, pp. 479–484.

Guide to Sharing and Partitioning IBM Tape Library Dataservers, Nov. 1996, IBM, International Technical Support Organization, San Jose Center.

IBM Technical Publication: Magstar and IBM 3590 High Performance Tape Subsystem Technical Guide, Nov. 1996, pp. 1–269.

Infoserver 100 System Operations Guide, First Edition Digital Equipment Corporation, 1990.

"InfoServer 150—Installation and Owner's Guide", EK–IN-FSV–OM–001, Digital Equipment Corporation, Maynard, Massachusetts 1991, Chapters 1 and 2.

InfoServer 150VXT Photograph.

Johnson, D.B., et al., The Peregrine High Performance RPC System, Software–Practice and Experience, 23(2):201–221, Feb. 1993.

Misc. Reference Manual Pages, SunOS 5.09.

Pictures of internal components of the InfoServer 150, taken from http://bindarydinosaurs.couk/Museum/Digital/infoserver/infoserver.php in Nov. 2004.

Raidtec FibreArray and Raidtec FlexArray UltraRAID Systems, Windows IT PRO Article, Oct. 1997.

Simplest Migration to Fibre Channel Technology.

S.P. Joshi, "Ethernet controller chip interfaces with variety of 16–bit processors," electronic Design, Hayden Publishing Co., Inc., Rochelle Partk, NJ, Oct. 14, 1982. pp. 193–200.

Office Action dated Jan. 21, 2003 for 10/174,720.

Office Action dated Feb. 27, 2001 for 90/354,682.

Office Action dated Aug. 11, 2000 for 09/354,682.

Office Action dated Dec. 16, 1999 for 09/354,682.

Office Action dated Nov. 6, 2002 for 10/023,786.

Office Action dated Jan. 21, 2003 for 10/081,110.

Office Action dated Jan. 27, 2005 in 10/658,163.

Office Action in Ex Parte Reexamination 90/007,127, mailed Feb. 7, 2005.

Office Action in Ex Parte Reexamination 90/007,126, mailed Feb. 7, 2005.

Office Action in Ex Parte Reexamination 90/007,125 mailed Feb. 7, 2005.

Office Action in Ex Parte Reexamination 90/007,124, mailed Feb. 7, 2005.

Office Action in Ex Parte Reexamination 90/007,123, mailed Feb. 7, 2005.

European Office Action issued Apr. 1, 2004 in Application No. 98966104.6–2413.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–13, 15 and 16 is confirmed.

Claims 7, 14 and 21 are cancelled.

Claims 1 and 17 are determined to be patentable as amended.

Claims 2–6, 8, 9, 18–20, 22 and 23, dependent on an amended claim, are determined to be patentable.

New claims 24–35 are added and determined to be patentable.

1. A device *for providing storage on remote storage devices* comprising:
   a first buffer providing memory work space;
   a first controller operable to connect to and interface with a first transport medium, wherein the first transport medium is operable according to a first protocol;
   a second controller operable to connect to and interface with a second transport medium, wherein the second transport medium is operable according to a second protocol; and
   a supervisor unit coupled to the first controller, the second controller and the first buffer, the supervisor unit operable:
   to map between devices connected to the first transport medium and storage devices connected to the second transport medium,
   to implement access controls for storage space on the storage devices and
   to process data in the first buffer to interface between the first controller and the second controller to allow access from devices connected to the first transport medium to the storage devices using native low level, block protocols.

17. A method *for providing storage on remote storage devices* comprising:
   interfacing with a first transport medium which is operable according to a first protocol;
   interfacing with a second transport medium which is operable according to a second protocol;
   mapping between devices connected to the first transport medium and storage devices connected to the second transport medium;
   implementing access controls for storage space on the storage devices; and
   allowing access from devices connected to the first transport medium to the storage devices using native low level, block protocols.

*24. The device of claim 1, wherein the first and second protocols comprise a Fibre Channel protocol.*

*25. The device of claim 1, wherein the first protocol comprises a Fibre Channel protocol and the second protocol comprises a Serial Attached SCSI Protocol.*

*26. The device of claim 1, wherein the first protocol comprises a Fibre Channel protocol and the second protocol comprises an ATA protocol.*

*27. The device of claim 1, wherein the first protocol comprises a SCSI protocol and the second protocol comprises a Fibre Channel protocol.*

*28. The storage network of claim 10, wherein the first and second protocols comprise a Fibre Channel protocol.*

*29. The storage network of claim 10, wherein the first protocol comprises a Fibre Channel protocol and the second protocol comprises a Serial Attached SCSI Protocol.*

*30. The storage network of claim 10, wherein the first protocol comprises a Fibre Channel protocol and the second protocol comprises a Serial ATA protocol.*

*31. The storage network of claim 10, wherein the first protocol comprises a SCSI protocol and the second protocol comprises a Fibre Channel protocol.*

*32. The method of claim 17, wherein the first and second protocols comprise a Fibre Channel protocol.*

*33. The method of claim 17, wherein the first protocol comprises a Fibre Channel protocol and the second protocol comprises a Serial Attached SCSI Protocol.*

*34. The method of claim 17, wherein the first protocol comprises a Fibre Channel protocol and the second protocol comprises a Serial ATA protocol.*

*35. The method of claim 17, wherein the first protocol comprises a SCSI protocol and the second protocol comprises a Fibre Channel protocol.*

\* \* \* \* \*